United States Patent
Le Tutour

(10) Patent No.: US 9,444,767 B2
(45) Date of Patent: Sep. 13, 2016

(54) METHOD AND SYSTEM FOR ASSOCIATING A DEVICE WITH A GATEWAY

(71) Applicant: Delta Dore, Bonnemain (FR)

(72) Inventor: Jean Le Tutour, Pleudihen sur Rance (FR)

(73) Assignee: Delta Dore (FR)

( * ) Notice: Subject to any disclaimer, the term of this patent is extended or adjusted under 35 U.S.C. 154(b) by 34 days.

(21) Appl. No.: 14/355,107

(22) PCT Filed: Oct. 29, 2012

(86) PCT No.: PCT/EP2012/071394
§ 371 (c)(1),
(2) Date: Apr. 29, 2014

(87) PCT Pub. No.: WO2013/064464
PCT Pub. Date: May 10, 2013

(65) Prior Publication Data
US 2014/0301406 A1     Oct. 9, 2014

(30) Foreign Application Priority Data

Nov. 4, 2011 (FR) .................... 11 59977
Oct. 9, 2012 (FR) .................... 12 59602

(51) Int. Cl.
| H04L 12/24 | (2006.01) |
| H04L 12/935 | (2013.01) |
| H04L 12/28 | (2006.01) |
| H04L 12/66 | (2006.01) |
| H04L 29/06 | (2006.01) |

(52) U.S. Cl.
CPC ......... *H04L 49/3054* (2013.01); *H04L 12/283* (2013.01); *H04L 12/2809* (2013.01); *H04L 12/2836* (2013.01); *H04L 12/66* (2013.01); *H04L 41/0816* (2013.01); *H04L 63/102* (2013.01)

(58) Field of Classification Search
CPC .......... H04L 49/3054; H04L 41/0816; H04L 12/283; H04L 12/2809; H04L 12/66; H04L 12/2836; H04L 63/102
See application file for complete search history.

(56) References Cited

U.S. PATENT DOCUMENTS

| 2007/0147396 | A1* | 6/2007 | Lee ............................... 370/401 |
| 2010/0190498 | A1* | 7/2010 | Ha ............................... 455/435.1 |
| 2011/0093704 | A1  | 4/2011 | Park et al. |
| 2013/0034057 | A1* | 2/2013 | Aramoto ...................... 370/328 |

FOREIGN PATENT DOCUMENTS

| EP | 2 053 790 | 4/2009 |
| WO | WO 2008/048933 | 4/2008 |

OTHER PUBLICATIONS

International Search Report dated Nov. 28, 2012, 6 pages, Netherlands.

* cited by examiner

*Primary Examiner* — Jung-Jen Liu
(74) *Attorney, Agent, or Firm* — Thorpe North & Western

(57) ABSTRACT

The present invention concerns a method and system for associating a device with a gateway, said gateway being designed to communicate firstly with the device via a communication network and secondly with another device referred to as the server. The method comprises a step of sending, by the server and to the gateway, of an authorization so that a device may be associated with this gateway.

5 Claims, 3 Drawing Sheets

| T-XZAB | T1 |
|---|---|
| H-VALC | H1 |
| H-ZKRV | H2 |
| T-VLRK | T2 |
| H-ABRZ | H3 |
| T-3545 | T3 |

| T-XZAB | T1 |
|---|---|
| H-VALC | H1 |
| H-ZKRV | H2 |
|  |  |
| H-ABRZ | H3 |
| T-3545 | T3 |

| T-XZAB | T1 |
|---|---|
| H-VALC | H1 |
| H-ZKRV | H2 |
| T-PRTL | T2 |
| H-ABRZ | H3 |
| T-3545 | T3 |

METHOD AND SYSTEM FOR ASSOCIATING A DEVICE WITH A GATEWAY

FIELD OF THE INVENTION

The present invention concerns a method and a system for associating a device with a gateway.

BACKGROUND

It is known that a gateway, for example a residential one, comprises means so that a device, of multimedia type, such as a computer, or home-automation type, such as a roller shutter or a sensor, can be associated with this gateway. To this end, it is known that it is necessary, prior to an association, to put the gateway in a particular operating mode by pressing on a button of this gateway.

Thus a user can, as he wishes, associate new devices with a gateway and thus centralise on this gateway access to a plurality of devices. However, the inventor observed that it was preferable to restrict the possibility that a user has to be able to associate a new device at any time since this device could interfere with other devices already associated and disturb the functioning of all the devices.

SUMMARY

The problem solved by the present invention is therefore restricting to particular times the possibility that a user (installer) is able to associate a new device with a gateway.

To this end, the present invention concerns a method for associating at least one device with a gateway designed to communicate firstly with the at least one device via a communication network and secondly with another device known as a server, characterised in that an authorisation for association is stored in the gateway and in that the method comprises the steps of:

associating the at least one device with the gateway by an installer or a user,
storing by the gateway of a list of devices that are associated with the gateway,
sending of the list of associated devices by the gateway to the server,
receiving by the gateway a prohibition that a device to be associated with the gateway from the server.

The invention also concerns a gateway comprising means for communicating firstly with at least one device via a communication network and secondly with another device, referred to as the server, characterised in that an authorisation of association is stored in the gateway and in that the gateway further comprises:

means for associating the at least one device with the gateway by an installer or a user,
means for storing by the gateway of a list of devices that are associated with the gateway,
means for sending of the list of associated devices by the gateway to the server,
means for receiving by the gateway a prohibition that a device to be associated with the gateway from the server.

The method makes it possible to control remotely, asynchronously or synchronously, time periods during which a device may be associated with the gateway and to control that some devices are not associated with the gateway. Failing prior reception of this authorisation, no device may be associated with the gateway. When the gateway receives a prohibition that a device to be associated with the gateway, the association of this device is suppressed.

According to one embodiment, the server sends to the gateway an authorisation for a device to be associated with the gateway.

According to one embodiment, the association of a device with the gateway is dependent on a prior mechanical action by a user on the gateway.

This embodiment is asynchronous, that is to say, firstly, the gateway is authorised for a device to be associated with it without a device being able to do this since it is only subsequently to the mechanical action of a user that a device may be associated with it. It is required that these two steps be performed for the association to be effective. These two steps may be distant in time, and hence the term asynchronous.

According to one embodiment, the authorisation sent to the gateway also designates one of the devices that is associated with it and said method then continues with the deletion of this equipment from the list of devices stored by the gateway and a new device is then authorised to be associated with the gateway.

This embodiment enables the server to indicate to the gateway a particular device that must no longer be associated with it. This embodiment is synchronous, that is to say a device can actually be associated with the gateway as soon as the designated device is deleted from the list of devices. This is for example used when a defective device must be replaced since in this case the defective device is deleted from the list of devices and the gateway is then immediately authorised to associate the replacement device to the gateway.

According to one embodiment, this authorisation is stored by the gateway.

According to one embodiment, each device associated with the gateway corresponds to a type of device and an identifier is allocated to each device associated with the gateway, the identifier being determined according to the number of devices of the same type as the device that precedes the device in the list.

According to one embodiment, the new device authorised to be associated with the gateway has the same identifier as the deleted device and is inserted in the list in place of the deleted device.

Thus the management of the identifiers of the device is simplified both at the server and at the gateway.

According to one embodiment, for each device associated with the gateway, the list comprises a serial number of the devices, the type of device and the identifier of the device.

According to one embodiment, the method comprises a step of initialising the authorisation that is stored by the gateway.

This embodiment makes it possible to define periods of time during which an device can be associated with the gateway and periods where this is not possible.

The invention also concerns a computer program that can be stored on a medium and/or downloaded from a communication network in order to be read by a computer system or a processor. This computer program comprises instructions for implementing the method mentioned above when said program is executed by the computer system or the processor. The invention also concerns storage means comprising such a computer program.

According to its hardware aspects, the present invention concerns a gateway comprising means for communicating firstly with a device via a communication network and secondly with another device, referred to as the server, and means so that an device can be associated therewith. The gateway is characterised in that it also comprises means for receiving an authorisation so that a device may be associated therewith.

According to another of its hardware aspects, the present invention concerns a device comprising means for communicating with a gateway via a communication network, characterised in that it comprises means for sending an authorisation to the gateway so that an device may be associated therewith.

According to another of its aspects, the present invention concerns a system for associating a device with a gateway, said gateway being designed to communicate firstly with the device via a communication network and secondly with another device referred to as the server. The system is characterised in that the device and the gateway are in accordance respectively with the above device and gateway.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION

Figure 1:
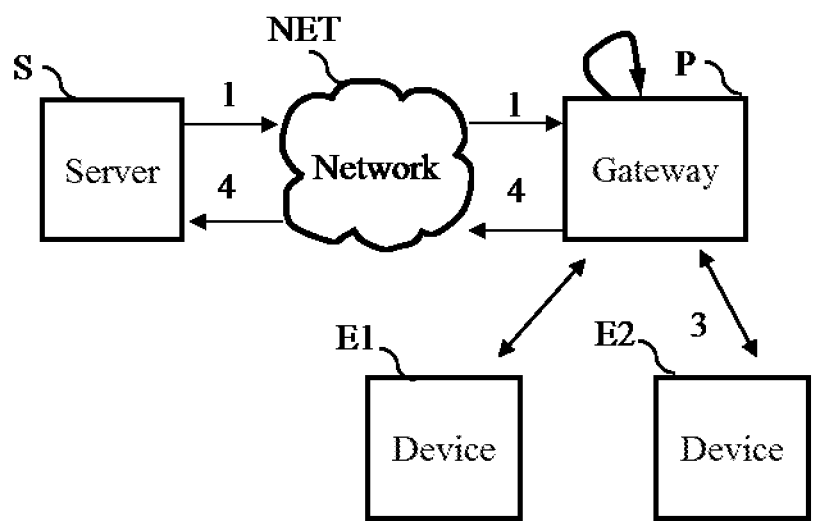
FIG. 1 shows a system for associating a device with a gateway according to the present invention.

FIG. 1 shows a system for associating devices, here two in number and denoted E1 and E2, with a gateway P.

The gateway P is designed to communicate firstly with the devices E1 and E2 via a communication network (not shown) and secondly with another device referred to as the server and denoted S. Such a system is merely an example that in no way limits the scope of the present invention, which is independent of the number of devices that may be associated with the gateway P.

The system uses an association method that is illustrated in FIG. 1.

The method comprises a step 1 of sending, by the server S to the gateway P, of an authorisation AUT so that a device (E1 or E2) can be associated with this gateway P.

According to one embodiment, the gateway P records locally a list of devices that are associated with it. This list is subsequently referenced L.

According to one embodiment, the method comprises a step 4 of sending the list of devices L from the gateway P to the server S.

According to one embodiment, the association of a device, for example E2, with the gateway P, shown in FIG. 1 by a step 3, is dependent on a prior mechanical action by a user on the gateway P, for example on a button on this gateway. This action is represented in FIG. 1 by a step 2. Thus, according to this embodiment, the device 3 can be associated with the gateway P if, firstly, an authorisation AUT has been received (step 1) and if the user has pressed on the button (step 2). The reception of the authorisation AUT and the action on the button are not necessarily performed just one after the other. A lapse of time may occur since the gateway P stores this authorisation, which may be in the form of a bit: the value "1" indicates that the authorisation is given and the value "0" indicates that the authorisation AUT has not been received. The only constraint for the device E2 to be able to be associated with the gateway is that the bit be at "1" and the user has next pressed on the button of the gateway P. Pressing on the button of the gateway P while the bit is at "0" causes no action and the device E cannot then be associated.

According to one embodiment, the authorisation AUT sent to the gateway (step 1) also designates one of the devices that is associated with it, for example E1, and the method then continues with the deletion of this device from the list of devices stored by the gateway. The method then continues with step 3 and optionally step 4 according to one embodiment. Step 3 is performed as soon as the designated device is deleted from the list of devices L, that is to say the device E2 can this time be associated without awaiting a prior mechanical action by a user on the gateway.

According to one embodiment, this authorisation AUT is stored by the gateway P, for example in the form of a bit at a particular value "1".

According to one embodiment, the method comprises a step of initialising the authorisation that is stored by the gateway P to a particular value, for example the value "1". This initialisation can be done, for example, when the gateway is manufactured. This initialisation does not require for the gateway P to be connected to the server S via a communication network, which is particularly advantageous when the system is deployed in a new building.

According to one embodiment, the method also comprises a step of sending, by the server S and to the gateway P, a prohibition on a device (E1 or E2) to be associated with the gateway P. The reception by the gateway P of this prohibition then modifies the authorisation that is stored by the gateway P. For example, this authorisation is set to the value "0".

Figure 2:
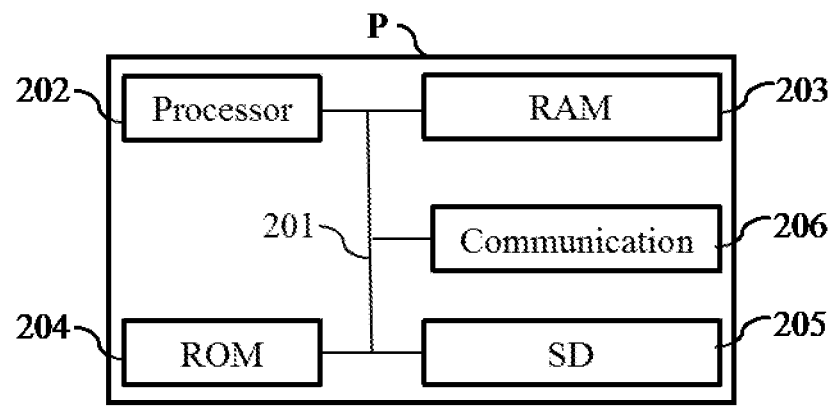
FIG. 2 illustrates schematically the architecture of a gateway.

FIG. 2 illustrates schematically the architecture of the gateway P.

The gateway P comprises connected by a communication bus 201:
- a processor, microprocessor or microcontroller 202;
- a volatile memory 203;
- a non-volatile memory 204;
- optionally, a storage-medium reader 205, such as an SD card (Secure Digital Card) reader;
- means 206 for interfacing with a communication network NET, such as for example a cellular telephony network or Internet; and
- man-machine interface means 207 making it possible, for example, to manage a touch screen and/or a set of keys and/or buttons.

The microcontroller 202 is capable of executing instructions loaded in the volatile memory 203 from the non-volatile memory 204, an external memory (not shown), a storage medium such as an SD card or the like, or a communication network. When the gateway P is powered up, the microcontroller 202 is capable of reading instructions from the volatile memory 203 and executing them. These instructions form a computer program that causes the microcontroller 202 to implement all or some of the methods described above in relation to FIG. 1.

The microcontroller 202 cooperates with the volatile and non-volatile memories and the means 206 so that a device E1 or E2 can be associated with them and to extract an authorisation AUT issuing from a signal received by the means 206. An authorisation AUT is stored, for example, in the form of a bit, in the ROM memory.

The non-volatile memory is also designed to store the list of devices L, for example in the form of MAC addresses of these devices.

Figure 3:
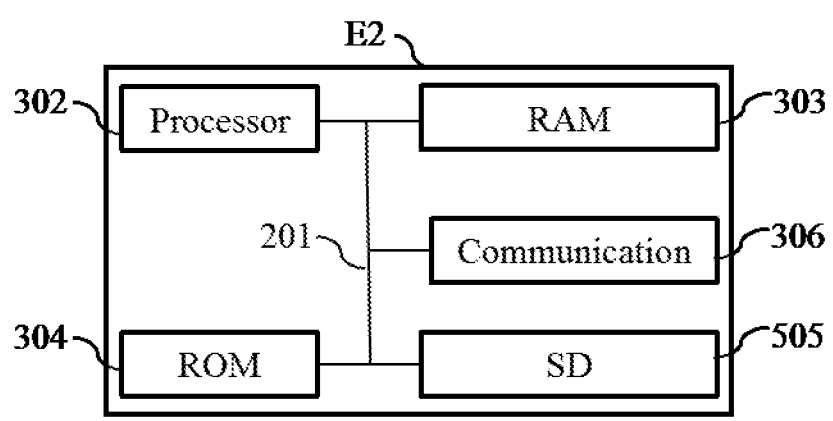
FIG. 3 illustrates schematically the architecture of a device.

FIG. 3 illustrates schematically the architecture of a device E2.

The device E2 comprises, connected by a communication bus 301:
- a processor, microprocessor or microcontroller 302;
- a volatile memory 303;
- a non-volatile memory 304;
- optionally, a storage-medium reader 305, such as an SD card (Secure Digital Card) reader;
- means 306 for interfacing with a communication network NET, such as for example a cellular telephony network or Internet; and
- man-machine interface means 307 making it possible, for example, to manage a touch screen and/or a set of keys and/or buttons.

The microcontroller 302 is capable of executing instructions loaded in the volatile memory 303 from the non-volatile memory 304, an external memory (not shown), a storage medium such as an SD card or the like, or a communication network. When the device E2 is powered up, the microcontroller 302 is capable of reading instructions from the volatile memory 303 and executing them. These instructions form a computer program that causes the microcontroller 302 to implement all or some of the methods described above in relation to FIG. 1.

The microcontroller 302 cooperates with the volatile and non-volatile memories and the means 306 in order to send an authorisation AUT to the gateway P so that a device E2 may be associated with it. The means 306 are also designed, according to one embodiment, to receive a list of devices L and then cooperate with the microcontroller 302 in order to process this list.

All or some of the methods described above in relation to FIG. 1 can be implemented in software form by the execution of a set of instructions by a programmable machine, such as a DSP (Digital Signal Processor) or a microcontroller, such as the microcontroller 202 and/or 302, or be implemented in hardware form by a machine or a dedicated component, such as an FPGA (Field-Programmable Gate Array) or an ASIC (Application-Specific Integrated Circuit).

Figures 4, 5A, 5B, 5C:
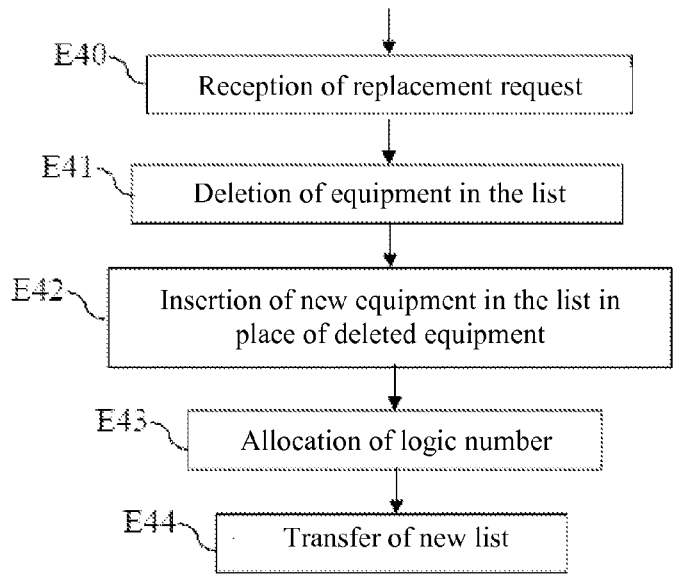
FIG. 4 shows an example of an algorithm executed by the gateway when a device associated with the gateway must be replaced.
FIGS. 5a to 5c show an example of the change in the list of devices associated with the gateway when the algorithm in FIG. 4 is executed.

FIG. 4 shows an example of an algorithm executed by the gateway when a device associated with the gateway must be replaced.

At step E40, the gateway P receives from the server S a request for the replacement of an device associated with the gateway P. The device is for example the equipment E1. The device E1 is identified by its serial number, for example the number VLRK. The device E2 is intended to replace the device E2 and is identified in the request by its serial number PRTL.

At step E41, the gateway P proceeds with the deletion of the device E1 in the list of devices associated with the gateway P.

An example of a list of devices associated with the gateway P is shown in FIG. 5a. According to the example in FIG. 5a, six devices are associated with the gateway P.

A first device of type T, with serial number XZAB and of type T, is associated with the gateway P and has an identifier or logic number T1. The type of device is for example a temperature sensor.

A second device, of serial number VALC and of type H, is associated with the gateway P and has an identifier or logic number H1. The type of device is for example a humidity sensor.

A third device, of serial number ZKRV and of type H, is associated with the gateway P and has an identifier or logic number H2. The identifier is equal to H2 since the third device is the second device of type H in the list.

A fourth device, of serial number VLRK and of type T, is associated with the gateway P and has an identifier or logic number T2. The identifier is equal to T2 since the fourth device is the second device of type T in the list. This is the device E1 to be replaced.

A fifth device, of serial number ABRZ and of type H, is associated with the gateway P and has an identifier or logic number H3. The identifier is equal to H3 since the fifth device is the second device of type H in the list.

A sixth device, of serial number 3545 and of type T, is associated with the gateway P and has an identifier or logic number T3. The identifier is equal to T332 since the sixth device is the third device of type T in the list.

The gateway P deletes the content of the line in the list corresponding to the device E1 to be replaced, as shown in FIG. 5d.

At step E42, the gateway P inserts in the list the serial number of the device E2 and its type in the line the content of which was deleted at step E41.

At step E43, the gateway allocates an identifier to the device E2. This identifier is identical to the one allocated to the device E1 replaced since the device E2 is recorded in the list at the same place as that of the device E1, as shown in the example in FIG. 5c.

At step E44, the gateway P sends the new list to the server S.

The invention claimed is:

1. A method for associating at least one device with a gateway designed to communicate firstly with the at least one device via a communication network and secondly with another device known as a server, wherein an authorisation for association is stored in the gateway and the method comprises the steps of:
    associating the at least one device with the gateway by an installer or a user,
    storing by the gateway of a list of devices that are associated with the gateway,
    sending the list of devices by the gateway to the server,
    receiving by the gateway of a prohibition of a prohibited device to be associated with the gateway of the server,
    receiving by the gateway an authorisation for an authorized device to be associated with the gateway, the authorization further designating one of the devices that is associated with the gateway,
    deleting the one of the devices designated from the list of devices, and
    associating the authorized device with the gateway, the authorized device having a same identifier as the one of the devices deleted and inserted in the list in place of the one of the devices deleted.

2. The method according to claim 1, in which the association of a device with the gateway is dependent on a prior mechanical action by a user on the gateway.

3. The method according to claim 1, wherein, for each device associated with the gateway, the list comprises a serial number of the device, a type of device and an identifier of the device.

4. The method according to claim 1, said method causing the server to perform initialising the authorisation that is stored by the gateway.

5. Gateway comprising circuitry causing the gateway to perform:
- communicating firstly with at least one device via a communication network and secondly with another item of equipment, referred to as a server, wherein an authorisation of association is stored in the gateway,
- associating of said at least one device with the gateway by an installer or a user,
- registering by the gateway of a list of devices associated with the gateway,
- sending the list of associated devices by the gateway to the server,
- receiving by the gateway of a prohibition on an association of the device to the gateway from the server,
- receiving by the gateway an authorisation for an authorized device to be associated with the gateway, the authorization further designating one of the devices that is associated with the gateway,
- deleting the one of the devices designated from the list of devices, and
- associating the authorized device with the gateway, the authorized device having a same identifier as the one of the devices deleted and inserted in the list in place of the one of the devices deleted.

* * * * *